(12) United States Patent
Ozawa et al.

(10) Patent No.: US 9,914,796 B2
(45) Date of Patent: Mar. 13, 2018

(54) METHOD FOR PRODUCING (METH)ACRYLIC RESIN COMPOSITION

(71) Applicant: KURARAY CO., LTD., Kurashiki-shi (JP)

(72) Inventors: Hiroshi Ozawa, Tainai (JP); Shouji Tanaka, Tainai (JP); Yasuhito Kitade, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 336 days.

(21) Appl. No.: 14/411,653

(22) PCT Filed: Jun. 28, 2013

(86) PCT No.: PCT/JP2013/004037
§ 371 (c)(1),
(2) Date: Dec. 29, 2014

(87) PCT Pub. No.: WO2014/002504
PCT Pub. Date: Jan. 3, 2014

(65) Prior Publication Data
US 2015/0191562 A1    Jul. 9, 2015

(30) Foreign Application Priority Data

Jun. 29, 2012 (JP) ................. 2012-147997

(51) Int. Cl.
| | | |
|---|---|---|
| *C08F 220/18* | (2006.01) | |
| *C08F 220/14* | (2006.01) | |
| *C08F 6/28* | (2006.01) | |
| *C08F 2/02* | (2006.01) | |
| *G02B 1/04* | (2006.01) | |
| *C08F 6/00* | (2006.01) | |
| *C08F 2/01* | (2006.01) | |
| *C08F 120/14* | (2006.01) | |

(52) U.S. Cl.
CPC .............. *C08F 220/18* (2013.01); *C08F 2/01* (2013.01); *C08F 2/02* (2013.01); *C08F 6/005* (2013.01); *C08F 220/14* (2013.01); *G02B 1/045* (2013.01); *C08F 120/14* (2013.01)

(58) Field of Classification Search
CPC .......... C08F 2/02; C08F 6/003; C08F 220/18; C08F 120/14; C08F 220/14; G02B 1/04
USPC .................... 528/481, 501; 526/329.5, 329.7
See application file for complete search history.

(56) References Cited

U.S. PATENT DOCUMENTS 3,968,059 A * 7/1976 Shimada et al. ........ C08F 20/14
526/328.5
5,728,793 A    3/1998 Kumagai et al.
6,632,907 B1  10/2003 Mizota et al.

FOREIGN PATENT DOCUMENTS

| JP | 06-228403 A | 8/1994 | |
|---|---|---|---|
| JP | 08-127618 A | 5/1996 | |
| JP | 2003-096105 A | 4/2003 | |
| JP | 2005082716 * | 3/2005 | .............. C08F 20/14 |
| JP | 2005-112984 A | 4/2005 | |
| JP | 2009-256493 A | 11/2009 | |

OTHER PUBLICATIONS

JP2005082716; Mitsuhiro et al.; Mar. 2005—Patent Translation.*
Machine translation of Detailed Description of JP 2009-256943; publication date: Nov. 5, 2009.*
Product Brochure: Ultra-thin light guide plate (LGP) & film (LGF), SVG Optronics Co., Ltd., 3 pages (Copyright 2003-2013).*
Machine translation of JP 2009-256493; publication date: Nov. 5, 2009 (as corrected).*
Supplementary European Search Report dated Jan. 11, 2016 in Patent Application No. 13 81 0745.
International Search Report dated Aug. 13, 2013 in PCT/JP2013/004037 Filed Jun. 28, 2013.
U.S. Appl. No. 14/411,735, filed Dec. 29, 2014, Ozawa, et al.

* cited by examiner

*Primary Examiner* — Fred M Teskin
(74) *Attorney, Agent, or Firm* — Oblon, McClelland, Maier & Neustadt, L.L.P.

(57) ABSTRACT

A method of producing a (meth)acrylic resin composition. The method comprises a step of continuously feeding a monomer mixture comprising 80 to 100% by mass of methyl methacrylate and 20 to 0% by mass of an alkyl acrylate to a tank reactor and bulk polymerizing the monomer mixture until obtaining a polymerization conversion of 40 to 70% by mass to prepare a reaction product; continuously discharging the reaction product, and heating the reaction product to 200° C. to 270° C. with a heater, and then separating the unreacted monomer with a extruder equipped with a vent; and transferring the separated unreacted monomer entrained by an inert gas flow to reuse the separated unreacted monomer as a raw material of the monomer mixture.

12 Claims, No Drawings

METHOD FOR PRODUCING (METH)ACRYLIC RESIN COMPOSITION

TECHNICAL FIELD

The present invention relates to a method of producing a (meth)acrylic resin composition. More specifically, the present invention relates to a method of producing a (meth) acrylic resin composition that can provide a molded product being substantially colorless and having high optical transmittance with a high production efficiency.

BACKGROUND ART

Molded products composed of (meth)acrylic resin compositions have excellent transparency and less optical strain and are therefore widely used as optical members such as lenses, prisms, phase difference films, light guide plates, light diffusion films, polarizing plate protective films and the like. In recent years, demands for lightweight and wide liquid crystal displays are high, and optical members are also required to be reduced in thickness and to be increased in area according to the demands. In addition, there is a demand for reproduction of highly fine images, and thereby a (meth)acrylic resin composition that is further less colored and has higher transparency is required.

The (meth)acrylic resin composition for optical members is usually mainly composed of a (meth)acrylic resin (also referred to as methacrylic polymer or (meth)acrylic polymer) produced by continuous bulk polymerization. For example, Patent Documents 1 and 2 each disclose a method of producing a methacrylic polymer. The method is characterized by continuously bulk polymerizing a monomer mixture comprising a radical polymerization initiator in an amount that is calculated from a calculation formula based on the half-life and concentration, discharging a polymer from the reactor at a specific polymer content, and continuously removing the volatile matters with a vent extruder. Patent Document 3 discloses a method of producing a (meth)acrylic polymer characterized by introducing an inert gas such as nitrogen gas into the shaft sealing portion of the vent extruder during the continuous removal of the volatile matter.

CITATION LIST

Patent Documents

Patent Document 1: JP S52-32665 B
Patent Document 2: JP 3453510 B
Patent Document 3: JP 2005-112984 A
Patent Document 4: JP S61-200842 A
Patent Document 5: JP H06-312122 A

Non-Patent Documents

Non-Patent Document 1: NOF Corporation technical data "Hydrogen Abstraction Ability and Initiation Efficiency of Organic Peroxide" (written in April, 2003)
Non-Patent Document 2: Chemical Engineering References, Edited by Society of Chemical Engineering of Japan, 3rd revision, p. 1068 (1968)

SUMMARY OF THE INVENTION

Problems to be Solved by the Invention

Unfortunately, the methods proposed in the above-mentioned technological documents may reduce the productivity, provide insufficient weather resistance, impart poor appearance to the molded product, or insufficiently prevent thermal coloration.

An object of the present invention is to provide a method of producing a (meth)acrylic resin composition that can provide a molded product being substantially colorless and having high optical transmittance with a high production efficiency.

Means for Solving the Problems

In order to achieve the above-mentioned object, the present invention includes the following aspects.

(1) A method of producing a (meth)acrylic resin composition, in which the method comprises the steps of continuously feeding a monomer mixture comprising 80 to 100% by mass of methyl methacrylate and 20 to 0% by mass of an alkyl acrylate to a tank reactor and bulk polymerizing the monomer mixture until obtaining a polymerization conversion of 40 to 70% by mass to obtain a reaction product; continuously discharging the reaction product, and heating the reaction product to 200° C. to 270° C. with a heater, and then separating the unreacted monomer with a extruder equipped with a vent; and transferring the separated unreacted monomer entrained by an inert gas flow to reuse the separated unreacted monomer as a raw material of the monomer mixture.
(2) The method according to Aspect (1), wherein the separated unreacted monomer is in a gas state and is entrained by the inert gas flow.
(3) The method according to Aspect (1), wherein the temperature in the tank reactor is 120° C. to 150° C.; and the mean residence time in the heater is 2 minutes or less.
(4) The method according to any one of Aspects (1) to (3), wherein the separated unreacted monomer has a b* value within a range of −0.5 to 1.5 in an optical path length of 10 mm.
(5) The method according to any one of Aspects (1) to (4), wherein the reaction solution in the tank reactor has a water content of 1000 ppm or less.
(6) A (meth)acrylic resin composition obtaiend by the method according to any one of Aspects (1) to (5).
(7) The (meth)acrylic resin composition according to Aspect (6), from which a molded product with a thickness of 200 mm formed at a molding temperature of 260° C. has a b* value of 3.5 or less.
(8) A light guide plate having a thickness of 1 mm or less and composed of the (meth)acrylic resin composition according to Aspect (6) or (7).

Advantageous Effects of the Invention

The method of the present invention can produce a (meth)acrylic resin composition that can provide a molded product being substantially colorless and having high optical transmittance with a high production efficiency. The (meth) acrylic resin composition obtained by the method according to the present invention has excellent injection moldability and can provide a substantially colorless thin and wide molded product with a high production efficiency.

EMBODIMENTS FOR CARRYING OUT THE INVENTION

The production method according to an embodiment of the present invention comprises a step of continuously feeding a monomer mixture to a tank reactor and bulk polymerizing the monomer mixture to obtain a reaction product, a step of continuously discharging the reaction product and separating an unreacted monomer, and a step of transferring the separated unreacted monomer entrained by an inert gas flow to reuse the separated unreacted monomer as a raw material of a monomer mixture. Herein, the term "unreacted monomer" refers to one or more monomers, which are discharged from the reactor and are not polymerized, of the monomer mixture. The reaction product to be discharged is not limited to the reaction product obtained by bulk polymerization in the tank reactor and may be a reaction product obtained in another reactor optionally connected to the post stage of the tank reactor described below, i.e., a reaction product obtained by further polymerizing in another reactor the unreacted monomer mixture in the reaction product obtained by bulk polymerization in the tank reactor to increase the polymerization conversion.

The monomer mixture used in the present invention comprises 80 to 100% by mass, preferably 80 to 96% by mass of methyl methacrylate and 0 to 20% by mass, preferably 4 to 20% by mass of an alkyl acrylate.

Examples of the alkyl acrylate include methyl acrylate, ethyl acrylate, propyl acrylate, butyl acrylate, 2-ethylhexyl acrylate and the like.

The monomer mixture may comprise another monomer, in addition to methyl methacrylate and the alkyl acrylate. Examples of such a monomer include alkyl methacrylates other than methyl methacrylate, such as ethyl methacrylate, butyl methacrylate and the like; aryl methacrylates such as phenyl methacrylate and the like; cycloalkyl methacrylates such as cyclohexyl methacrylate, norbornenyl methacrylate and the like; aryl acrylates such as phenyl acrylate and the like; cycloalkyl acrylates such as cyclohexyl acrylate, norbornenyl acrylate and the like; aromatic vinyl compounds such as styrene, α-methylstyrene and the like; vinyl monomers having a single polymerizable alkenyl group in a molecule, such as acrylamide, methacrylamide, acrylonitrile, methacrylonitrile and the like. The content of these monomers other than methyl methacrylate and the alkyl acrylate in the monomer mixture is preferably 10% by mass or less and more preferably 5% by mass or less.

In the present invention, in addition to the monomer mixture, polymerization subsidiary materials such as a polymerization initiator, a chain transfer agent and the like may be fed to the tank reactor.

The polymerization initiator used in the present invention may be any initiator that generates reactive radicals, and examples thereof include t-hexyl peroxyisopropylmonocarbonate, t-hexyl peroxy-2-ethylhexanoate, 1,1,3,3-tetramethylbutylperoxy-2-ethyl hexanoate, t-butyl peroxypivalate, t-hexyl peroxypivalate, t-butyl peroxyneodecanoate, t-hexyl peroxyneodecanoate, 1,1,3,3-tetramethylbutyl peroxyneodecanoate, 1,1-bis(t-hexylperoxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate) and the like. Among these, t-hexyl peroxy-2-ethylhexanoate, 1,1-bis(t-hexyl peroxy)cyclohexane, dimethyl 2,2'-azobis(2-methylpropionate) and the like are preferred.

The polymerization initiator preferably has a half-life of 0.5 to 120 seconds, more preferably 2 to 60 seconds, at the temperature in the tank reactor described below. The polymerization initiator used in the bulk polymerization preferably has a hydrogen abstraction ability of 40% or less and more preferably 30% or less. These polymerization initiators may be used alone or in combination of two or more thereof.

The hydrogen abstraction ability can be known from technical data of a polymerization initiator manufacturer (for example, Non-Patent Document 1). Alternatively, the hydrogen abstraction ability can be measured by a radical trapping method using α-methylstyrene dimer, i.e., an α-methylstyrene dimer trapping method. This measurement is usually performed as follows. First, a polymerization initiator is cleaved into radical moieties in the presence of α-methylstyrene dimer serving as a radical trapping agent. Among the generated radical moieties, a radical moiety having low hydrogen abstraction ability is bound to and captured by the double bond of the α-methylstyrene dimer. On the other hand, a radical moiety having high hydrogen abstraction ability abstracts hydrogen from the cyclohexane to generate a cyclohexyl radical, and the cyclohexyl radical is bound to and captured by the double bond of the α-methylstyrene dimer to generate cyclohexane-captured product. Accordingly, the ratio (mole fraction) of the radical moieties having high hydrogen abstraction ability to the theoretical radical moiety yield determined by quantitatively measuring the cyclohexane or cyclohexane-captured product is defined as the hydrogen abstraction ability.

The amount of the polymerization initiator used is preferably 0.0001 to 0.02 part by mass, more preferably 0.001 to 0.01 part by mass, based on 100 parts by mass of the monomer mixture.

Examples of the chain transfer agent used in the present invention include alkyl mercaptans such as n-octylmercaptan, n-dodecylmercaptan, t-dodecylmercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate and the like; α-methylstyrene dimer; terpinolene and the like. Among these chain transfer agents, preferred are monofunctional alkyl mercaptans such as n-octylmercaptan, n-dodecylmercaptan and the like. These chain transfer agents may be used alone or in combination of two or more thereof. The amount of the chain transfer agent used is preferably 0.1 to 1 part by mass, more preferably 0.2 to 0.8 part by mass, and most preferably 0.3 to 0.6 part by mass, based on 100 parts by mass of the monomer mixture.

Although in principle no solvent is used in bulk polymerization, the monomer mixture can comprise a solvent for adjusting the viscosity of the reaction solution and the like if necessary. Preferred examples of the solvent include aromatic hydrocarbons such as benzene, toluene, ethylbenzene and the like. These solvents may be used alone or in combination of two or more thereof. The amount of the solvent used is preferably 30 parts by mass or less, more preferably 10 parts by mass or less, based on 100 parts by mass of the monomer mixture.

The monomer mixture used in the present invention has a dissolved oxygen content of preferably 10 ppm or less, more preferably 5 ppm or less, still more preferably 4 ppm or less, and most preferably 3 ppm or less. By controlling the dissolved oxygen content within such a range, the polymerization reaction smoothly progresses, and a molded product not having silver or coloring can be readily prepared.

The monomer mixture and the polymerization subsidiary materials may be separately fed to a tank reactor. Alternatively, the monomer mixture and the polymerization subsidiary materials may be mixed in advance, and the resulting reaction raw material may be fed to a tank reactor. The monomer mixture and the polymerization subsidiary materials may be mixed by any method. For example, methyl methacrylate, an alkyl acrylate, a polymerization initiator, and a chain transfer agent are continuously fed to a mixer placed in the previous stage to the reaction tank from the storage tanks through the respective tubes and are mixed, and the resulting mixture can be continuously fed to the reaction tank. The mixing is preferably performed in an inert atmosphere, such as nitrogen gas. The mixer can have a dynamic stirrer or a static stirrer.

The tank reactor usually comprises a reaction tank, a stirring means for stirring the solution in the reaction tank, a feeding port for feeding a reaction raw material to the reaction tank, and an discharge port for discharging the reaction product from the reaction tank. In the continuous flow reaction, the solution amount in the reaction tank is maintained substantially constant by balancing between the amount fed to the reaction tank and the amount discharged from the reaction tank. The solution amount in the reaction tank is preferably ¼ or more, more preferably ¼ to ¾, and most preferably ⅓ to ⅔ based on the capacity of the reaction tank.

Examples of the stirring means include a max blend stirrer, a lattice blade stirrer, a propeller stirrer, a screw stirrer, a helical ribbon stirrer, a paddle stirrer, and the like. Among these stirrers, a max blend stirrer is preferred from the viewpoint of homogenous mixing.

The temperature in the tank reactor, i.e., the temperature of the solution in the reaction tank, is preferably 100° C. to 170° C., more preferably 110° C. to 160° C., and most preferably 120° C. to 150° C. The solution temperature can be controlled by an external heat exchange type conditioning method with, for example, a jacket or heat transfer tube or by a self-heat exchange type conditioning method by placing, in the reaction tank, a tube in which the reaction raw material or reaction product flows.

In the production method of the present invention, the perfect mixing time ($\theta_M$ [hr]) of the tank reactor is preferably longer than the length of the half-life ($\tau_{1/2}$ [hr]) of the radical polymerization initiator at the temperature in the tank reactor. That is, a relationship of $\theta_M > \tau_{1/2}$, is preferably satisfied, and it is more preferable to satisfy a relationship of $\theta_M > 1.2 \times \tau_{1/2}$. The perfect mixing time is one indicator representing the mixing characteristics of a reaction tank and can be determined from an "$n \cdot \theta_M$-Re curve" showing the relationship between $n \cdot \theta_M$ (dimensionless mixed number (n represents the rotation speed [1/sec]) of the stirrer blade) and Re (Reynolds' number: an indicator representing the disorder state of a solution). The perfect mixing time and the $n \cdot \theta_M$-Re curve are described in Non-Patent Document 2, Patent Document 4, Patent Document 5 and the like.

In the tank reactor, bulk polymerization is performed until obtaining a polymerization conversion of 40 to 70% by mass and preferably 35 to 65% by mass.

The agitation power ($P_v$) of the tank reactor is preferably 0.2 to 7 kW/m³, more preferably 0.3 to 6 kW/m³, and most preferably 0.4 to 5 kW/m³. The agitation power can be adjusted by the shape and the rotation speed of the stirrer blade and the viscosity and the density of the solution in the reaction tank.

The mean residence time ($\theta$) of the reaction raw material in the tank reactor is preferably 0.5 to 10 hours, more preferably 1 to 7 hours, and most preferably 2 to 5 hours. A too short mean residence time increases the necessary amount of the polymerization initiator. The increase in the amount of the polymerization initiator tends to make it difficult to control the polymerization reaction and also difficult to control the molecular weight. On the other hand, a too long mean residence time tends to elongate the time until the reaction becomes the steady state and to decrease the productivity. The mean residence time can be adjusted by the capacity of the tank reactor and the feed amount of the reaction raw material.

The agitation power ($P_v$ [kW/m³]) of the tank reactor and the mean residence time ($\theta$[hr]) in the tank reactor are adjusted such that the concentration (I [ppm]) of the radical polymerization initiator in the reaction raw material and the half-life ($\tau_{1/2}$ [hr]) of the radical polymerization initiator at the temperature in the tank reactor preferably satisfy the relationship: $P_v \times \theta \times I \times \tau_{1/2} < 4$ and more preferably $P_v \times \theta \times I \times \tau_{1/2} < 3$. The bulk polymerization is preferably performed in an inert gas atmosphere, such as nitrogen gas.

Another reactor may be connected to the post stage of the tank reactor. The reactor that is connected to the post stage may be a tank reactor or a tube reactor.

In the method of producing a (meth)acrylic resin composition of the present invention, the water content in the reaction solution in the tank reactor is preferably 1000 ppm or less, more preferably 700 ppm or less, and most preferably 280 ppm or less. By controlling the water content to 1000 ppm or less, a resin foreign material of several to several tens micrometers can be prevented from being unintentionally generated during the polymerization reaction, and when the resulting (meth)acrylic resin composition is formed into a film or a sheet by melt-molding, occurrence of defects having external diameter of several tens micrometers caused by the resin foreign material as nuclei can be considerably reduced.

Although the mechanism of suppressing the generation of the resin foreign material is not clear, it is conceived that a high molecular weight (meth)acrylic resin generated in the gas phase of the polymerization tank is mixed as the resin foreign material with the monomer mixture during the polymerization and becomes the nucleus of a defect as a unmelted material in the melt-molding.

The amount of water in the reaction solution can be reduced by, for example, a method by treating the raw material solution in advance with an absorption, dehydration column and the like, or a method by introducing an inert gas into the gas phase of the tank reactor and condensing a part of the steam together with the inert gas with a brine-cooled condenser to discharge the water to the outside of the system.

When the reaction product obtained by the bulk polymerization is discharged from the tank reactor, the discharge amount of the reaction product is preferably balanced with the feed amount of the reaction raw material such that the solution amount in the reaction tank is constant.

The reaction product to be discharged preferably has a (meth)acrylic resin content of 40 to 70% by mass and more preferably 35 to 65% by mass. A too high content of the (meth)acrylic resin increases the viscosity, resulting in a tendency of requiring a higher agitation power. A too low content of the (meth)acrylic resin readily causes insufficient devolatilization, and a molded product formed from the resulting (meth)acrylic resin composition tends to have poor appearance such as silver.

The (meth)acrylic resin preferably has a weight-average molecular weight (hereinafter, may referred to as Mw) of 35 thousand to 200 thousand, more preferably 40 thousand to 150 thousand, and most preferably 45 thousand to 130 thousand. A too small Mw tends to decrease the impact resistance and the toughness of a molded product obtained from the (meth)acrylic resin composition. A too large Mw decreases the fluidity of the (meth)acrylic resin composition, resulting in a tendency of reducing the molding processability.

In the (meth)acrylic resin, the ratio of the weight-average molecular weight to the number-average molecular weight (hereinafter, this ratio may be noted as molecular weight distribution) is preferably from 1.5 to 2.6, more preferably from 1.6 to 2.3, and most preferably from 1.7 to 2.0. When the molecular weight distribution is low, the molding processability of the (meth)acrylic resin composition tends to decrease, whereas when the molecular weight distribution is high, the molded product produced from the (meth)acrylic resin composition tends to have low impact resistance and to be brittle.

The weight-average molecular weight and the number-average molecular weight are molecular weights in terms of standard polystyrene measured by gel permeation chromatography (GPC). The number-average molecular weight and the weight-average molecular weight of a (meth)acrylic resin can be controlled by fixing the types and the amounts of the polymerization initiator and the chain transfer agent.

The unreacted monomer is separated from the discharged reaction product. The separation is performed by so-called vent extrusion. In the vent extrusion, an unreacted monomer is separated by heating the reaction product with a heater to 220° C. to 270° C. and more preferably 230° C. to 260° C. and then vaporizing the unreacted monomer with an extruder equipped with a vent. The mean residence time in the heater is preferably 5 minutes or less and more preferably 2 minutes or less. A shorter mean residence time in the heater tends to hardly cause burning of the (meth)acrylic resin. As in the method described in Patent Document 3, an inert gas such as nitrogen gas can be introduced to the vicinity of the shaft sealing portion of the extruder equipped with a vent. The introduction of nitrogen gas can prevent the (meth)acrylic resin from adhering to the shaft sealing portion.

The reaction product after the removal of the unreacted monomer, i.e., the (meth)acrylic resin composition, can be formed into a pellet or a powder and granule in accordance with a known method, in order to enhance the workability as a molding material. The content of the monomer mixture in the (meth)acrylic resin composition obtained in the present invention is preferably 1% by mass or less and more preferably 0.5% by mass or less.

In the production method of the present invention, the separated unreacted monomer is transferred by entrainment of an inert gas flow and is reused as a raw material of a monomer mixture. The unreacted monomer is preferably transferred in a gas state. The inert gas used for transferring the unreacted monomer is preferably fed to a device, such as the extruder vent, piping, or tank, placed at a position posterior to the vaporization of the unreacted monomer.

Examples of the inert gas include nitrogen gas, helium gas and the like, and preferred is nitrogen gas. The amount of the entrained inert gas is preferably 0.01 to 1.00 mol, more preferably 0.05 to 0.50 mol, based on 100 mol of the unreacted monomer separated from the reaction product (in terms of those at ordinary temperature and ordinary pressure).

A gas mixture composed of the inert gas and the unreacted monomer is optionally cooled. Methyl methacrylate has a melting point of −48° C. When the unreacted monomer is methyl methacrylate, the gas mixture is cooled to a temperature that is higher than the melting point and lower than the boiling point. The cooled unreacted monomer (for example, methyl methacrylate) becomes a liquid. Since the above-mentioned inert gas is not liquefied by this cooling step, the inert gas and the unreacted monomer can be separated from each other. The liquefaction can be accelerated by applying a pressure simultaneously with cooling. The liquefied unreacted monomer is recovered in a container placed below the cooling device.

A mist separating device is preferably placed at the subsequent stage of the cooling device. The unreacted monomer in a mist state that has not been recovered by the cooling device can be recovered in a container placed below the mist separating device. Examples of the mist separating device include a cyclone-type mist separator and a mesh-type mist separator.

The inert gas after the recovery of the unreacted monomer may be released to the atmosphere by a flare stack. Since the inert gas after the recovery of the unreacted monomer may contain a small amount of the unreacted monomer, the inert gas may be fed again for transferring the unreacted monomer separated from the reaction product. The yield of the unreacted monomer can be increased by thus circulating the inert gas.

The unreacted monomer recovered in the containers is reused as a raw material of the monomer mixture directly or after purification by a known method. The recovered unreacted monomer has a b* value of preferably −1 to 2 and more preferably −0.5 to 1.5. The b* is chromaticity in accordance with Commission Internationale de l'Eclairage (CIE) standard (1976) or JIS Z-8729.

The (meth)acrylic resin composition obtained by the production method of the present invention can optionally comprise various additives. The amount of the additives is preferably 0.5% by mass or less, more preferably 0.2% by mass or less, based on the amount of the (meth)acrylic resin composition. A too large amount of additives may cause poor appearance of the molded product, such as silver.

Examples of the additives include antioxidants, thermal degradation inhibitors, ultraviolet absorbers, light stabilizers, lubricants, mold-releasing agents, polymer processing aids, antistatic agents, flame retardants, dyes and pigments, light diffusion agents, organic coloring agents, delustering agents, impact resistance modifiers, and fluorescent materials.

The antioxidant has by alone an effect of preventing oxidative degradation of a resin in the presence of oxygen, and examples thereof include phosphorus antioxidants, hindered phenol antioxidants, and thioether antioxidants. These antioxidants may be used alone or in combination of two or more thereof. Among these antioxidants, from the viewpoint of the effect of preventing the degradation of optical characteristics due to coloring, preferred are phosphorus antioxidants and hindered phenol antioxidants. A combination of a phosphorus antioxidant and a hindered phenol antioxidant is more preferred.

In the combination of a phosphorus antioxidant and a hindered phenol antioxidant, the ratio thereof is not particularly limited, and the mass ratio of the phosphorus antioxidant to the hindered phenol antioxidant is preferably 1/5 to 2/1 and more preferably 1/2 to 1/1.

Preferred examples of the phosphorus antioxidants include 2,2-methylenebis(4,6-di-t-butylphenyl)octyl phosphite (trade name: Adekastab HP-10, manufactured by ADEKA Corporation) and tris(2,4-di-t-butylphenyl) phosphite (trade name: IRGAFOS 168, manufactured by Ciba Specialty Chemicals Corporation).

Preferred examples of the hindered phenol antioxidants include pentaerythrityl tetrakis[3-(3,5-di-t-butyl-4-hydroxyphenyl)propionate] (trade name: IRGANOX 1010, manufactured by Ciba Specialty Chemicals Corporation) and octadecyl 3-(3,5-di-t-butyl-4-hydroxyphenyl)propionate (trade name: IRGANOX 1076, manufactured by Ciba Specialty Chemicals Corporation).

The thermal degradation inhibitor has an effect of preventing thermal degradation of a resin by capturing polymer radicals generated by exposure to high temperature in a substantially oxygen-free condition.

Preferred examples of the thermal degradation inhibitors include 2-t-butyl-6-(3'-t-butyl-5'-methyl-hydroxybenzyl)-4-methylphenyl acrylate (trade name: Sumilizer GM, manufactured by Sumitomo Chemical Co., Ltd.) and 2,4-di-t-amyl-6-(3',5'-di-t-amyl-2'-hydroxy-α-methylbenzyl)phenyl acrylate (trade name: Sumilizer GS, manufactured by Sumitomo Chemical Co., Ltd.).

The ultraviolet absorber is a compound having an ability of absorbing ultraviolet. The ultraviolet absorber is a compound that is recognized to have a function of mainly converting light energy into heat energy.

Examples of the ultraviolet absorbers include benzophenones, benzotriazoles, triazines, benzoates, salicylates, cyanoacrylates, oxalic anilides, malonates, and formamidines. These ultraviolet absorbers may be used alone or in combination of two or more thereof.

Among these ultraviolet absorbers, preferred are benzotriazoles or ultraviolet absorbers having a maximum molar absorption coefficient $E_{max}$ of 1200 $dm^3 \cdot mol^{-1} cm^{-1}$ or less in a wavelength range of 380 nm to 450 nm.

The benzotriazoles have an effect of highly preventing a reduction in optical characteristics, such as coloring due to ultraviolet irradiation, and are therefore preferred as the ultraviolet absorber for the case of applying the (meth) acrylic resin composition to the use requiring the characteristics described above.

Preferred examples of the benzotriazoles include 2-(2H-benzotriazol-2-yl)-4-(1,1,3,3-tetramethylbutyl)phenol (trade name: TINUVIN 329, manufactured by Ciba Specialty Chemicals Corporation) and 2-(2H-benzotriazol-2-yl)-4,6-bis(1-methyl-1-phenylethyl)phenol (trade name: TINUVIN 234, manufactured by Ciba Specialty Chemicals Corporation).

Ultraviolet absorbers having a maximum molar absorption coefficient $\epsilon_{max}$ of 1200 $dm^3 \cdot mol^{-1} cm^{-1}$ or less in a wavelength range of 380 to 450 nm can prevent the resulting molded product from yellowing. Such ultraviolet absorbers are preferred as the ultraviolet absorber for the case of applying the (meth)acrylic resin composition to the use requiring the characteristics described above.

The maximum molar absorption coefficient $\epsilon_{max}$ of an ultraviolet absorber is measured as follows. An ultraviolet absorber (10.00 mg) is dissolved in 1 L of cyclohexane such that undissolved matter is not visually observed. The resulting solution is put in a quartz glass cell of 1 cm×1 cm×—3 cm and is subjected to measurement of the absorbance in a wavelength range of 380 to 450 nm with a spectrophotometer, U-3410, manufactured by Hitachi, Ltd. The maximum molar absorption coefficient $\epsilon_{max}$ is calculated from the molecular weight (Mw) of the ultraviolet absorber and the measured maximum absorbance ($A_{max}$) by the following expression:

$$\epsilon_{max} = [A_{max}/(10 \times 10^{-3})] \times MW.$$

Examples of the ultraviolet absorber having a maximum molar absorption coefficient $\epsilon_{max}$ of 1200 $dm^3 \cdot mol^{-1} cm^{-1}$ or less in a wavelength range of 380 to 450 nm include 2-ethyl-2'-ethoxy-oxalanilide (trade name: Sanduvor VSU, manufactured by Clariant (Japan) K.K.).

Among these ultraviolet absorbers, from the viewpoint of preventing deterioration of a resin by ultraviolet irradiation, benzotriazoles are preferably used.

The light stabilizer is a compound that is recognized to have a function of capturing radicals mainly generated by oxidation by light. Examples of suitable light stabilizers include hindered amines such as compounds having 2,2,6,6-tetraalkylpiperidine skeletons.

The mold-releasing agent is a compound having a function of easily releasing a molded product from the mold. Examples of the mold-releasing agent include higher alcohols such as cetyl alcohol, stearyl alcohol and the like; and glycerin higher fatty acid esters such as stearic acid monoglyceride, stearic acid diglyceride and the like. In the present invention, the mold-releasing agent is preferably a combination of a higher alcohol and a glycerin fatty acid monoester. In the combination, the mass ratio of the higher alcohol to the glycerin fatty acid monoester is not particularly limited and is preferably 2.5/1 to 3.5/1 and more preferably 2.8/1 to 3.2/1.

The polymer processing aid is a compound having an effect of contributing to the accuracy and reduction in the thickness of a film formed from the (meth)acrylic resin composition. The polymer processing aid is usually polymer particles that can be produced by emulsion polymerization and have a particle diameter of 0.05 to 0.5 μm.

The polymer particles may be mono layer particles composed of a polymer having a single composition ratio and a single limiting viscosity or may be multilayer particles composed of two or more polymers having different composition ratios or different limiting viscosities. In such cases, a preferred example is particles having a two-layer structure comprising an inner layer composed of a polymer having a low limiting viscosity and an outer layer composed of a polymer having a high limiting viscosity of 5 dL/g or more.

The polymer processing aid preferably has a limiting viscosity of 3 to 6 dL/g. When the limiting viscosity is too low, the effect of improving the moldability tends to be low. A too high limiting viscosity tends to reduce the melt fluidity of the (meth)acrylic resin composition.

The (meth)acrylic resin composition may contain an impact resistance modifier. Examples of the impact resistance modifier include core shell type modifiers containing acrylic rubber or diene rubber as a core layer component; and a modifier comprising a plurality of rubber particles.

The organic coloring agent is preferably a compound having a function of converting ultraviolet rays, which are recognized to be harmful to resins, into visible light.

Examples of the light diffusion agent and the delustering agent include glass microparticles, cross-linked polysiloxane microparticles, cross-linked polymer microparticles, talc, calcium carbonate, and barium sulfate.

Examples of the fluorescent material include fluorescent pigments, fluorescent dyes, fluorescent white dyes, fluorescent brightening agents, and fluorescent whitening agents.

These additives may be added to the polymerization reaction raw material, may be added to the reaction product, or may be added to the (meth)acrylic resin composition obtained after devolatilization.

The (meth)acrylic resin composition obtained by the production method of the present invention can be molded (heat melt molded) by a known method, such as injection molding, compression molding, extrusion molding, or vacuum molding, to provide various molded products. A molded product with a thickness of 200 mm formed from the (meth)acrylic resin composition at a molding temperature of 260° C. has a b* value of preferably 4 or less, and more preferably 3.5 or less.

Examples of molded products composed of the (meth) acrylic resin composition include signboard components such as advertising pillars, stand signboards, side signboards, transom signboards, rooftop signboards and the like; display components such as partition plates, store displays and the like; lighting components such as fluorescent lamp covers, mood lighting covers, lampshades, luminous ceilings, light walls, chandeliers and the like; interior components such as pendants, mirrors and the like; building components such as doors, domes, safety window glass, partitions, stair wainscots, balcony wainscots, roofs of buildings for leisure, and the like; transport-related components such as aircraft windshields, visors for piloted, motorbikes, motorboat windshields, light shield plates for buses, and sun visors, rear visors, head wings, and headlight covers for automobiles, and the like; electronic device components such as nameplates for acoustic imaging, stereo covers, television protection masks, vending machines and the like; medical device components such as infant incubators, roentgen components and the like; device-related components such as machine covers, gauge covers, experiment devices, rulers, dial plates, observation windows, and the like; optics-related Components such as liquid crystal protection plates, light guide plates, light guide films, Fresnel lenses, lenticular lenses, front plates of various displays, diffusion plates and the like; traffic-related components such as road markers, guide plates, curve mirrors, soundproof walls and the like; film members such as polarizer protective films, polarizing plate protective films, phase difference films, surface materials for automobile interiors, surface materials for cellular phones, marking films and the like; members for home electric appliances such as canopies and control panels of washing machines, top panels of rice cookers, and the like; greenhouses, large-scale water baths, box water baths, clock panels, bathtubs, sanitary equipment, desk mats, sport components, toys, masks for face protection during welding and the like. Among these molded products, in the present invention, light guide plates having a thickness of 1 mm or less are preferred.

EXAMPLES

The present invention will now be more specifically described by examples and comparative examples, but is not limited by the following examples. The present invention further encompasses all embodiments by arbitrarily combining matters specifying the technical features, such as characteristic values, forms, production methods, and uses, described above.

Measurement or the like of the physical values in Examples and Comparative Examples was performed by the following methods.

(Measurement of Water)

The water content in a reaction solution was measured with a Karl-Fischer water meter (KMA-210, manufactured by Kyoto Electronics Manufacturing Co., Ltd.).

(Polymerization Conversion)

A column (GLC-G-230, manufactured by Sciences Inc., INERT CAP 1 (df: 0.4 μm, I.D.: 0.25 mm, length: 60 m)) was connected to a gas chromatograph (GC-14A, manufactured by Shimadzu Corporation). Analysis was performed under conditions of an injection temperature of 180° C., a detector temperature of 180° C., and column temperature increase of 10° C./min from 60° C. to 200° C.

(b* Value of Separated Unreacted Monomer)

An unreacted monomer was placed in a quartz cell having a length of 10 mm, a width of 10 mm, and a height of 45 mm, and the transmittance in the width direction of 10 mm was measured with a color and color-difference meter, ZE-2000, manufactured by Nippon Denshoku Industries Co., Ltd. The XYZ value was determined from the measured value in accordance with the method described in JIS Z-8722, and the color difference (b*) was calculated in accordance with the method described in JIS K-7105.

(Melt Flow Rate)

The melt flow rate was measured in accordance with JIS K7210 at 230° C. and a load of 3.8 kg for 10 minutes.

(Measurement of b* Value of Molded Product)

A plate for measurement was produced using a mold for a plate having a length of 200 mm, a width of 60 mm, and thickness of 6 mm with an injection molding machine (J-110EL III, manufactured by The Japan Steel Works, Ltd.) at a cylinder temperature of 280° C. and a mold temperature of 60° C. for a molding cycle of 2 minutes.

The optical transmittance of the plate was measured in an optical path length of 200 mm with a spectrophotometer (PC-2200, manufactured by Shimadzu Corporation) using a C-light source for every 1 nm over a wavelength range of 340 nm to 700 nm. The XYZ value was determined from the measured values in accordance with the method described in JIS Z-8722, and the b* value was calculated in accordance with the method described in JIS Z-8729.

(Measurement of Transmittance of Molded Sheet)

A pelletized (meth)acrylic resin composition was injection-molded into a plate having a length of 200 mm, a width of 60 mm, and thickness of 0.6 mm with an injection molding machine (M-100-DM, manufactured by Meiki Co., Ltd.) at a cylinder temperature of 260° C., a mold temperature of 60° C., and a molding cycle of 2 minutes.

The optical transmittance of the resulting plate was measured with PC-2400 manufactured by Shimadzu Corporation at a wavelength of 550 nm in an optical path length of 200 mm.

(Film Moldability)

A pelletized (meth)acrylic resin composition was injection-molded into a film having a thickness of 100 μm at a cylinder temperature of 260° C. The film was visually observed for whether coloring occurred or not.

(Evaluation of Film Defect)

The film was subjected to count of the number of defects (fish eyes) per unit area with a gel counter (model: FS-5, manufactured by Optical Control Systems GmbH), and the appearance was evaluated by the following criteria:

A: the number of defects per square meter is less than 2,000,

B: the number of defects per square meter is 2,000 or more and less than 3,000,

C: the number of defects per square meter is 3,000 or more and less than 6,000, and D: the number of defects per square meter is 6,000 or more.

Example 1

A monomer mixture was prepared by putting 94 parts by mass of purified methyl methacrylate and 6 parts by mass of methyl acrylate in an autoclave equipped with a stirrer and a sampling tube. The monomer mixture contained 26% of a monomer recovered by the method described below. A raw material solution was prepared by dissolving 0.007 part by mass of a polymerization initiator (2,2'-azobis(2-methylpropionitrile (AIBN), hydrogen abstraction ability: 1%, one-hour half-life temperature: 83° C.) and 0.32 part by mass of a chain transfer agent (n-octylmercaptan) in the monomer mixture. The oxygen gas in the production apparatus was replaced by nitrogen gas.

The raw material solution was fed to a continuous flow type tank reactor equipped with a brine-cooled condenser at a constant flow rate such that the mean residence time was 120 minutes. Simultaneously, nitrogen gas was introduced into the gas phase of the reactor in an amount of 3.3 mol based on 100 mol in total of the monomers in the raw material solution. Bulk polymerization was performed by controlling the reaction solution temperature to 140° C. and controlling the pressure of the reactor to 0.3 MPa with a pressure regulating valve through the brine-cooled condenser. During the operation, all of the raw material solution and water in the receiver of the condenser were discharged to the outside of the system. After the operation for three days, the reaction solution was taken out from the sampling tube of the reactor. The measured polymerization conversion was 57% by mass, and the water content was 250 ppm.

The solution discharged from the reactor was heated with a heater to 240° C. for a mean residence time of 90 seconds and was then fed to a twin-screw extruder equipped with a vent controlled to 260° C. at a constant flow rate. Nitrogen gas was fed to the vent portion of the twin-screw extruder in an amount of 0.06 mol based on 100 mol of the unreacted monomer. The unreacted monomer was vaporized in the twin-screw extruder, was mixed with the nitrogen gas in the vent portion, and was transferred. The unreacted monomer entrained by the nitrogen gas flow was recovered by a cooling device and a mist separating device. The recovered unreacted monomer had a b* value of 0.5.

The resin component was extruded into a strand shape. The strand was cut with a pelletizer to give a pelletized (meth)acrylic resin composition. The amount of the residual volatile component was 0.1% by mass.

The melt flow rate of the resulting (meth)acrylic resin composition, the b* value of a molded product, and the transmittance of a molded sheet are shown in Table 1.

Example 2

A raw material solution was prepared in an autoclave equipped with a sampling tube as in Example 1. Subsequently, the oxygen gas in the production apparatus was replaced by nitrogen gas. The raw material solution was fed to a continuous flow type tank reactor equipped with a brine-cooled condenser at a constant flow rate such that the mean residence time was 120 minutes. Simultaneously, nitrogen gas was introduced into the gas phase of the reactor in an amount of 3.3 mol based on 100 mol in total of the monomers in the raw material solution. Bulk polymerization was performed by controlling the reaction solution temperature to 140° C. and controlling the pressure of the reactor to 0.3 MPa with a pressure regulating valve through the brine-cooled condenser. During the operation, a part of the raw material solution and water in the receiver of the condenser were discharged to the outside of the system. After the operation for three days, the reaction solution was taken out from the sampling tube of the reactor. The measured polymerization conversion was 57% by mass, and the water content was 700 ppm.

The solution discharged from the reactor was heated with a heater to 240° C. for a mean residence time of 90 seconds and was then fed to a twin-screw extruder equipped with a vent controlled to 260° C. at a constant flow rate. Nitrogen gas was fed to the vent portion of the twin-screw extruder in an amount of 0.03 mol based on 100 mol of the unreacted monomer. The unreacted monomer was vaporized in the twin-screw extruder, was mixed with the nitrogen gas in the vent portion, and was transferred. The unreacted monomer entrained by the nitrogen gas flow was recovered by a cooling device and a mist separating device. The recovered unreacted monomer had a b* value of 0.78.

The resin component was extruded into a strand shape. The strand was cut with a pelletizer to give a pelletized (meth)acrylic resin composition. The amount of the residual volatile component was 0.1% by mass.

The melt flow rate of the resulting (meth)acrylic resin composition, the b* value of a molded product, and the transmittance of a molded sheet are shown in Table 1.

Example 3

In an autoclave equipped with a stirrer and a sampling tube was put 100 parts by mass of purified methyl methacrylate. The methyl methacrylate contained 30% of methyl methacrylate recovered by the method described below. A raw material solution was prepared by dissolving 0.007 part by mass of a polymerization initiator (2,2'-azobis(2-methylpropionitrile (AIBN), hydrogen abstraction ability: 1%, one-hour half-life temperature: 83° C.) and 0.26 part by mass of a chain transfer agent (n-octylmercaptan) in the methyl methacrylate. The oxygen gas in the production apparatus was replaced by nitrogen gas. Subsequently, the same procedure as in Example 1 was performed, and the operation was continuously performed for three days.

The reaction solution was taken out from the sampling tube of the reactor. The measured polymerization conversion was 50% by mass, and the water content was 250 ppm.

The solution discharged from the reactor was heated with a heater to 240° C. for a mean residence time of 90 seconds and was then fed to a twin-screw extruder equipped with a vent controlled to 260° C. at a constant flow rate. Nitrogen gas was fed to the vent portion of the twin-screw extruder in an amount of 0.06 mol based on 100 mol. The unreacted monomer was vaporized in the twin-screw extruder, was mixed with the nitrogen gas in the vent portion, and was transferred. The unreacted monomer transferred by the nitrogen gas flow was recovered by a cooling device and a mist separating device. The recovered unreacted monomer had a b* value of 0.5.

The resin component was extruded into a strand shape. The strand was cut with a pelletizer to give a pelletized (meth)acrylic resin composition. The amount of the residual volatile component was 0.1% by mass.

The melt flow rate of the resulting (meth)acrylic resin composition, the b* value of a molded product, the film moldability, and the result of the film defect evaluation are shown in Table 1.

Example 4

The same procedure as in Example 1 was performed except that all condensate from the brine-cooled condenser was returned to the polymerization tank. After the operation for three days, the reaction solution was taken out from the sampling tube of the reactor. The measured polymerization conversion was 57% by mass, and the water content was 1200 ppm. The recovered unreacted monomer had a b* value of 0.79.

The melt flow rate of the resulting (meth)acrylic resin composition, the b* value of a molded product, the film moldability, and the result of the film defect evaluation are shown in Table 1.

Comparative Example 1

A pelletized (meth)acrylic resin composition was prepared by the same procedure as in Example 1 except that nitrogen gas was not fed to the vent portion. The recovered unreacted monomer had a b* value of 3.

The melt flow rate of the resulting (meth)acrylic resin composition, the b* value of a molded product, and the transmittance of a molded sheet are shown in Table 1.

Comparative Example 2

A pelletized (meth)acrylic resin composition was prepared by the same procedure as in Example 1 except that the heating temperature with a heater was 280° C. The recovered unreacted monomer had a b* value of 3.

The melt flow rate of the resulting (meth)acrylic resin composition, the b* value of a molded product, and the transmittance of a molded sheet are shown in Table 1.

Comparative Example 3

A pelletized (meth)acrylic resin composition was prepared by the same procedure as in Example 4 except that nitrogen gas was not fed to the vent portion. The recovered unreacted monomer had a b* value of 0.5.

The melt flow rate of the resulting (meth)acrylic resin composition, the b* value of a molded product, the film moldability, and the result of the film defect evaluation are shown in Table 1.

TABLE 1

| | Ex. | | | | Comp. Ex. | | |
|---|---|---|---|---|---|---|---|
| | 1 | 2 | 3 | 4 | 1 | 2 | 3 |
| Water content in reaction solution [ppm] | 250 | 700 | 250 | 1200 | 250 | 250 | 1200 |
| Temperature of heater [° C.] | 240 | 240 | 240 | 240 | 240 | 280 | 240 |
| Amount of nitrogen gas fed to vent portion [mol based on 100 mol of unreacted monomer] | 0.06 | 0.03 | 0.06 | 0.06 | 0 | 0.06 | 0 |
| Melt flow rate [g/10 min] | 10 | 10 | 2 | 2 | 10 | 10 | 2 |
| b* value of molded product | 2.7 | 3.3 | 2.7 | 3.3 | 7.3 | 5.0 | 7.5 |
| Light transmittance of molded sheet [%] | 80 | 80 | — | — | 70 | 75 | — |
| Film moldability | — | — | No coloring | No coloring | — | — | Coloring |
| Film defect evaluation | — | — | A | C | — | — | C |

As shown in Table 1, the method of the present invention can produce a (meth)acrylic resin composition that can provide a molded product being substantially colorless and having high optical transmittance with a high production efficiency. The (meth)acrylic resin composition obtained by the method according to the present invention has excellent moldability and can provide a substantially colorless thin and wide molded product with a high production efficiency.

The invention claimed is:

1. A method of producing a (meth)acrylic resin composition, the method comprising:
    continuously feeding a monomer mixture comprising 80 to 100% by mass of methyl methacrylate and 20 to 0% by mass of an alkyl acrylate to a tank reactor and bulk polymerizing the monomer mixture until obtaining a polymerization conversion of 40 to 70% by mass to obtain a reaction product;
    continuously discharging the reaction product, and heating the reaction product to 200° C. to 270° C. with a heater, and then separating the unreacted monomer with a extruder equipped with a vent; and
    transferring the separated unreacted monomer entrained by an inert gas flow to reuse the separated unreacted monomer as a raw material of the monomer mixture;
    wherein a reaction solution in the tank reactor has a water content of 1,000 ppm or less.

2. The method according to claim 1, wherein the separated unreacted monomer is in a gas state and is entrained by the inert gas flow.

3. The method according to claim 1, wherein the separated unreacted monomer has a b* value within a range of −0.5 to 1.5.

4. The method according to claim 2, wherein the separated unreacted monomer has a b* value within a range of −0.5 to 1.5.

5. A method of producing a (meth)acrylic resin composition, the method comprising:
    continuously feeding a monomer mixture comprising 80 to 100% by mass of methyl methacrylate and 20 to 0% by mass of an alkyl acrylate to a tank reactor and bulk polymerizing the monomer mixture until obtaining a polymerization conversion of 40 to 70% by mass to obtain a reaction product;
    continuously discharging the reaction product, and heating the reaction product to 200° C. to 270° C. with a heater, and then separating the unreacted monomer with a extruder equipped with a vent; and
    transferring the separated unreacted monomer entrained by an inert gas flow to reuse the separated unreacted monomer as a raw material of the monomer mixture;
    wherein the temperature in the tank reactor is 120° C. to 150° C.; and the mean residence time in the heater is 2 minutes or less.

6. The method according to claim 5, wherein the separated unreacted monomer has a b* value within a range of −0.5 to 1.5.

7. The method according to claim 5, wherein the reaction solution in the tank reactor has a water content of 1000 ppm or less.

8. A method of producing a (meth)acrylic resin composition, the method comprising:

continuously feeding a monomer mixture comprising 80 to 100% by mass of methyl methacrylate and 20 to 0% by mass of an alkyl acrylate to a tank reactor and bulk polymerizing the monomer mixture until obtaining a polymerization conversion of 40 to 70% by mass to obtain a reaction product;

continuously discharging the reaction product, and heating the reaction product to 200° C. to 270° C. with a heater, and then separating the unreacted monomer with a extruder equipped with a vent; and transferring the separated unreacted monomer entrained by an inert gas flow to reuse the separated unreacted monomer as a raw material of the monomer mixture;

wherein:

the temperature in the tank reactor is 120° C. to 150° C.;

the mean residence time in the heater is 2 minutes or less; and the separated unreacted monomer is in a gas state and is entrained by the inert gas flow.

9. The method according to claim 6, wherein the reaction solution in the tank reactor has a water content of 1000 ppm or less.

10. The method according to claim 8, wherein the separated unreacted monomer has a b* value within a range of −0.5 to 1.5.

11. The method according to claim 8, wherein the reaction solution in the tank reactor has a water content of 1000 ppm or less.

12. The method according to claim 10, wherein the reaction solution in the tank reactor has a water content of 1000 ppm or less.

* * * * *